(12) United States Patent
Liu et al.

(10) Patent No.: US 12,057,052 B2
(45) Date of Patent: Aug. 6, 2024

(54) DISPLAY PANEL AND ELECTRONIC DEVICE HAVING DATA DRIVER PROVIDING BIAS CURRENTS BASED ON CONFIGURATION DATA CORRESPONDING TO DATA SIGNAL PERIODS

(71) Applicant: TCL CHINA STAR OPTOELECTRONICS TECHNOLOGY CO., LTD., Guangdong (CN)

(72) Inventors: Jinfeng Liu, Guangdong (CN); Miaorong Cai, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/617,583

(22) PCT Filed: Nov. 23, 2021

(86) PCT No.: PCT/CN2021/132418
§ 371 (c)(1),
(2) Date: Dec. 9, 2021

(87) PCT Pub. No.: WO2023/082324
PCT Pub. Date: May 19, 2023

(65) Prior Publication Data
US 2024/0005837 A1 Jan. 4, 2024

(30) Foreign Application Priority Data
Nov. 10, 2021 (CN) .......................... 202111325207.2

(51) Int. Cl.
*G09G 3/20* (2006.01)

(52) U.S. Cl.
CPC ..... *G09G 3/2092* (2013.01); *G09G 2310/0275* (2013.01); *G09G 2310/0291* (2013.01); *G09G 2310/08* (2013.01); *G09G 2330/021* (2013.01)

(58) Field of Classification Search
CPC ......... G09G 3/2092; G09G 2310/0275; G09G 2310/0291; G09G 2310/08;
(Continued)

(56) References Cited

U.S. PATENT DOCUMENTS

| | | | |
|---|---|---|---|
| 2003/0011408 A1* | 1/2003 | Tsuchi ................. | G09G 3/2011 327/108 |
| 2003/0076285 A1* | 4/2003 | Albu ........................ | H03F 3/72 345/87 |

(Continued)

FOREIGN PATENT DOCUMENTS

| | | |
|---|---|---|
| CN | 102347011 A | 2/2012 |
| CN | 103474015 A | 12/2013 |

(Continued)

OTHER PUBLICATIONS

International Search Report in International application No. PCT/CN2021/132418, mailed on Jul. 29, 2022.
(Continued)

*Primary Examiner* — Richard J Hong
(74) *Attorney, Agent, or Firm* — PV IP PC; Wei Te Chung; Zhigang Ma

(57) ABSTRACT

The present application discloses a display device and electronic device. The display device is configured by sequentially configuring the corresponding first bias current, second bias current, and third bias in a start period, a sustain period, and an end period. The current value of the first bias current is greater than the current value of the second bias current, and/or the current value of the third bias current is greater than the current value of the second bias current,
(Continued)

which improves the display quality and reduces display power consumption.

16 Claims, 6 Drawing Sheets

(58) Field of Classification Search
CPC .......... G09G 2330/021; G09G 3/3688; G09G 3/3685; G09G 3/3648; G09G 3/3291; G09G 3/3225; G09G 3/2011; H03F 3/45475; H03F 3/72; H03F 3/45219
See application file for complete search history.

(56) References Cited

U.S. PATENT DOCUMENTS

| | | | | |
|---|---|---|---|---|
| 2004/0036670 | A1* | 2/2004 | Chung | G09G 3/3688 345/99 |
| 2009/0309857 | A1 | 12/2009 | Nishimura | |
| 2010/0097142 | A1* | 4/2010 | Liang | H03F 3/45475 330/277 |
| 2010/0265273 | A1* | 10/2010 | Nishimura | G09G 3/3688 330/253 |
| 2011/0007058 | A1* | 1/2011 | Hisano | H03F 3/45219 330/253 |
| 2011/0205193 | A1 | 8/2011 | Nishimura et al. | |
| 2012/0013378 | A1* | 1/2012 | Kim | G09G 3/3685 327/170 |
| 2012/0013587 | A1* | 1/2012 | Yen | G09G 3/3688 345/211 |
| 2012/0019502 | A1* | 1/2012 | Kawagoshi | G09G 3/3688 345/211 |
| 2014/0253534 | A1* | 9/2014 | Kim | G09G 3/3688 345/99 |
| 2016/0049133 | A1* | 2/2016 | Park | G09G 3/3648 345/212 |
| 2016/0093270 | A1* | 3/2016 | Lee | G09G 3/3688 345/82 |
| 2021/0295782 | A1* | 9/2021 | Bae | G09G 3/3688 |
| 2021/0335182 | A1 | 10/2021 | Hwang et al. | |
| 2022/0334604 | A1* | 10/2022 | Kim | G09G 3/3225 |
| 2023/0136867 | A1* | 5/2023 | Kim | G09G 3/3291 345/204 |

FOREIGN PATENT DOCUMENTS

| | | |
|---|---|---|
| CN | 106257580 A | 12/2016 |
| JP | 2019144548 A | 8/2019 |
| TW | 201207801 A | 2/2012 |

OTHER PUBLICATIONS

Written Opinion of the International Search Authority in International application No. PCT/CN2021/132418, mailed on Jul. 29, 2022.
Chinese Office Action issued in corresponding Chinese Patent Application No. 202111325207.2 dated Jan. 5, 2023, pp. 1-8.

* cited by examiner

| Driver | Pattern | 0White | 1Black | 3Green | 5Gary 191 | 7chess | 9 H gray Bar | 14 colorbar | 21Pixel on/off | 22Window shutdown | 23H_strip | 32 Sub v-line |
|---|---|---|---|---|---|---|---|---|---|---|---|---|
| Static power consumption (mW) (VAA+HVAA+VDD) | SDR ON | 3336.41 | 3020.10 | 3103.80 | 3380.31 | 3264.08 | 3360.44 | 3177.47 | 24549.86 | 3216.30 | 26090.09 | 3239.97 |
| | SDR OFF | 3689.09 | 3358.50 | 3460.12 | 3770.68 | 3591.97 | 3772.44 | 3558.03 | 24878.11 | 3607.94 | 26365.42 | 3589.75 |
| | ΔP | 352.69 | 338.40 | 356.32 | 390.36 | 327.89 | 411.99 | 380.56 | 328.24 | 391.64 | 275.33 | 349.78 |
| | Powerdown | 9.56% | 10.08% | 10.30% | 10.35% | 9.13% | 10.92% | 10.70% | 1.32% | 10.85% | 1.04% | 9.74% |

DISPLAY PANEL AND ELECTRONIC DEVICE HAVING DATA DRIVER PROVIDING BIAS CURRENTS BASED ON CONFIGURATION DATA CORRESPONDING TO DATA SIGNAL PERIODS

BACKGROUND OF INVENTION

Field of Invention

The present application relates to a field of display technology, in particular to a display device and an electronic device.

Description of Prior Art

With popularization of electronic products and the increasingly prominent resource problems, requirements for low power consumption of consumer electronic products are becoming higher and higher. For example, Energy Star is a government program jointly promoted by the US Department of Energy and the US Environmental Protection Agency to better protect the living environment and save energy. It is mainly used in fields of computers, office equipment, household appliances, and so on. Display products also need to meet Energy Star's power consumption requirements before they can be sold on the market, and energy efficiency standards are also evolving and tightening year by year (from ES7.0 to ES8.0 to ES9.0).

Therefore, there is an urgent need to continuously develop more energy-saving and higher-quality display technologies.

It should be noted that the above introduction of the background technology is only to facilitate a clear and complete understanding of the technical solutions of the present application. Therefore, it cannot be considered that the above-mentioned technical solutions involved are known to those skilled in the art just because it appears in the background of the present application.

SUMMARY OF INVENTION

The present application provides a display device and an electronic device to improve display quality and reduce technical problems of display power consumption.

In a first aspect, the present application provides a display device, which includes a display panel comprising a plurality of data lines; and a data driver, wherein an output terminal of the data driver is electrically connected to each of the plurality of data lines correspondingly, the data driver comprises an output amplifier, the output amplifier is configured to output a corresponding data signal to the display panel, and a duration of a pulse of the data signal comprises a start period, a sustain period, and an end period, wherein, in the start period, the output amplifier has a first bias current; in the sustain period, the output amplifier has a second bias current; in the end period, the output amplifier has a third bias current; and a current value of the first bias current is greater than a current value of the second bias current, and/or a current value of the third bias current is greater than the current value of the second bias current.

In some of these embodiments, the current value of the first bias current is equal to or greater than the current value of the third bias current.

In some of these embodiments, a duration of the start period is less than or equal to a duration of the sustain period; and/or a duration of the end period is less than or equal to the duration of the sustain period.

In some of these embodiments, the duration of the start period is equal to the duration of the end period.

In some of these embodiments, the output amplifier comprises: an input stage configured to access and differentially process a first input signal and a second input signal; an amplification stage, wherein an input terminal of the amplification stage is electrically connected to an output terminal of the input stage, and is configured to amplify a difference result between the first input signal and the second input signal; and an output stage, wherein an input terminal of the output stage is electrically connected to an output terminal of the amplification stage, and an output terminal of the output stage is configured to output the corresponding data signal.

In some of these embodiments, the input stage comprises: a transistor MN1, wherein a gate of the transistor MN1 is configured to access the first input signal, and the transistor MN1 is an N-channel transistor; a transistor MN2, wherein a gate of the transistor MN2 is configured to access the second input signal, and the transistor MN2 is an N-channel transistor; a transistor MN3, wherein a drain of the transistor MN3 is electrically connected to a source of the transistor MN1 and a source of the transistor MN2, a gate of the transistor MN3 is configured to access a first control signal, a source of the transistor MN3 is configured to connect to a negative power signal, and the transistor MN3 is an N-channel transistor; a transistor MP3, wherein a source of the transistor MP3 is configured to connect to a positive power signal, a gate of the transistor MP3 is configured to connect to a second control signal, and the transistor MP3 is a P-channel transistor; a transistor MP2, wherein a source of the transistor MP2 is electrically connected to a drain of the transistor MP3, a gate of the transistor MP2 is configured to access the second input signal, and the transistor MP2 is a P-channel transistor; and a transistor MP1, wherein a source of the transistor MP1 is electrically connected to the drain of the transistor MP3, a gate of the transistor MP1 is configured to access the first input signal, and the transistor MP1 is a P-channel transistor.

In some of these embodiments, the amplification stage comprises: an adjustable current source IP5, wherein an input terminal of the adjustable current source IP5 is configured to access the positive power signal, and an output terminal of the adjustable current source IP5 is electrically connected to a drain of the transistor MN2; an adjustable current source I7, wherein an input terminal of the adjustable current source I7 is electrically connected to the output terminal of the adjustable current source IP5; an adjustable current source IN5, wherein an input terminal of the adjustable current source IN5 is electrically connected to an output terminal of the adjustable current source I7 and a drain of the transistor MP2, an output terminal of the adjustable current source IN5 is configured to connect to the negative power signal, and the negative power signal and the positive power signal are used to form a DC power supply; an adjustable current source IP6, wherein an input terminal of the adjustable current source IP6 is configured to access the positive power signal, an output terminal of the adjustable current source IP6 is electrically connected to the drain of the transistor MN1, an output current value of the adjustable current source IP6 is equal to an output current value of the adjustable current source IP5; an adjustable current source I8, wherein an input terminal of the adjustable current source I8 is electrically connected to the output terminal of the adjustable current source IP6, and an output current value of the adjustable current source I8 is equal to an output current value of the adjustable current source I7; and an adjustable current source IN6, wherein an input terminal of the adjustable current source IN6 is electrically connected to the output terminal of the adjustable current source I8 and a drain of the transistor MP1, an output terminal of the adjustable current source IN6 is configured to connect to the negative power signal, and an output current value of the adjustable current source IN6 is equal to an output current value of the adjustable current source IN5.

In some of these embodiments, the output stage comprises: a transistor MP9, wherein a gate of the transistor MP9 is electrically connected to the output terminal of the adjustable current source IP6, a source of the transistor MP9 is configured to connect to the positive power signal, and a drain of the transistor MP9 is configured to output the data signal, and the transistor MP9 is a P-channel transistor; and a transistor MN9, wherein a gate of the transistor MN9 is electrically connected to the output terminal of the adjustable current source I8, a drain of the transistor MN9 is electrically connected to the drain of the transistor MP9, and a source of the transistor MN9 is configured to connect to the negative power signal.

In some of these embodiments, the output stage further comprises: a capacitor CM1, wherein one terminal of the capacitor CM1 is electrically connected to the gate of the transistor MP9, and another terminal of the capacitor CM1 is electrically connected to the drain of the transistor MP9; and a capacitor CM2, wherein one terminal of the capacitor CM2 is electrically connected to the another terminal of the capacitor CM1, and another terminal of the capacitor CM2 is electrically connected to the gate of the transistor MN9.

In a second aspect, the present application provides an electronic device, which includes a mobile terminal and the display device in any of the above embodiments; wherein the mobile terminal is combined with the display device.

In the display device and electronic device provided by the present application, the output amplifier is provided with corresponding first bias current, second bias current, and third bias current in the start period, the sustain period, and the end period, respectively, and the current value of the first bias current is greater than the current value of the second bias current, and/or the current value of the third bias current is greater than the current value of the second bias current, so that time required for pulse edge skipping of the data signal can be effectively shorten, and charging ability of the data signal is improved, thereby improving the display quality. Meanwhile, under the same display quality, compared with a constant bias current in a traditional technical solution, the present application provides the output amplifier with three dynamically changing bias currents, which effectively reduces display power consumption.

BRIEF DESCRIPTION OF DRAWINGS

The following detailed description of specific implementations of the present application in conjunction with the accompanying drawings will make the technical solutions and other beneficial effects of the present application obvious.

DETAILED DESCRIPTION OF PREFERRED EMBODIMENTS

Figure 1:
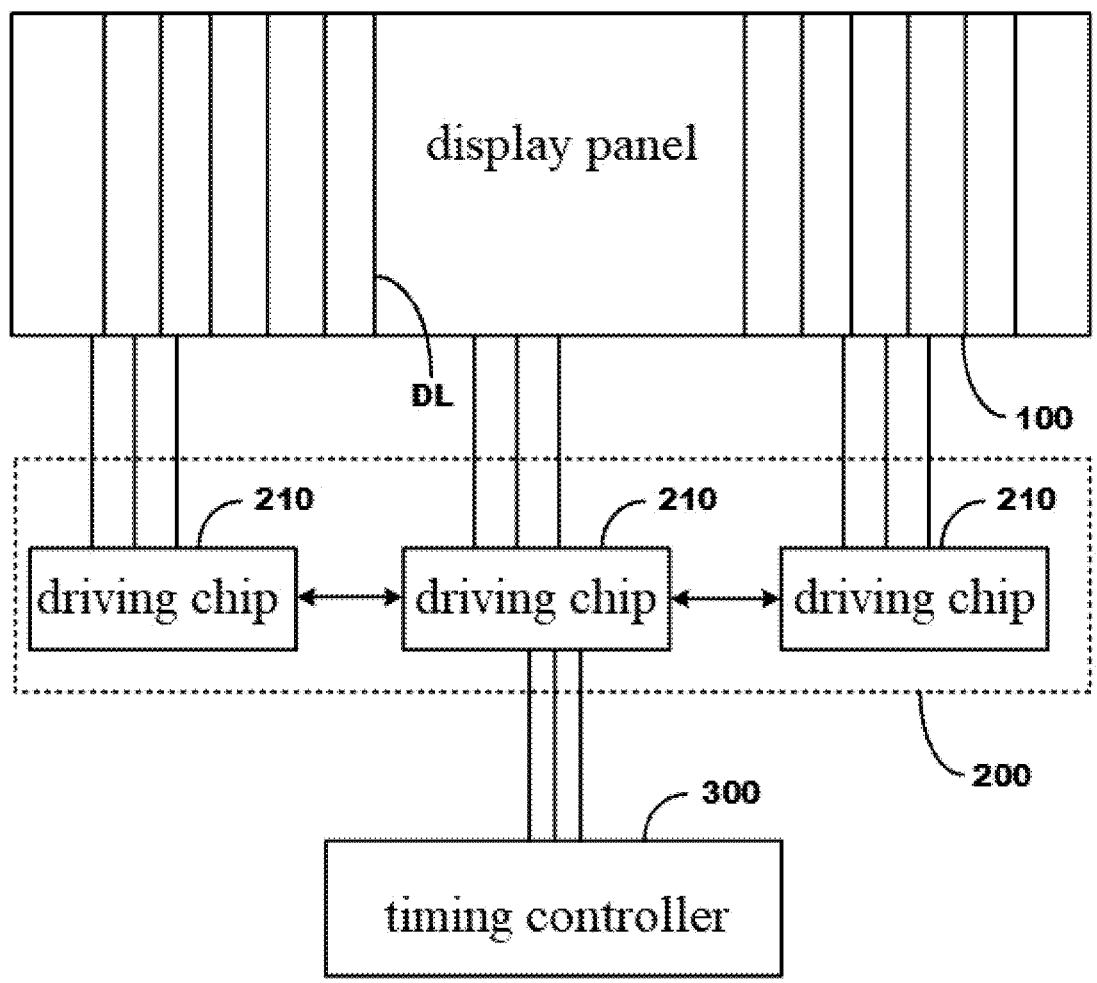
FIG. 1 is a schematic structural diagram of a display device provided by an embodiment of the application.
Figure 2:
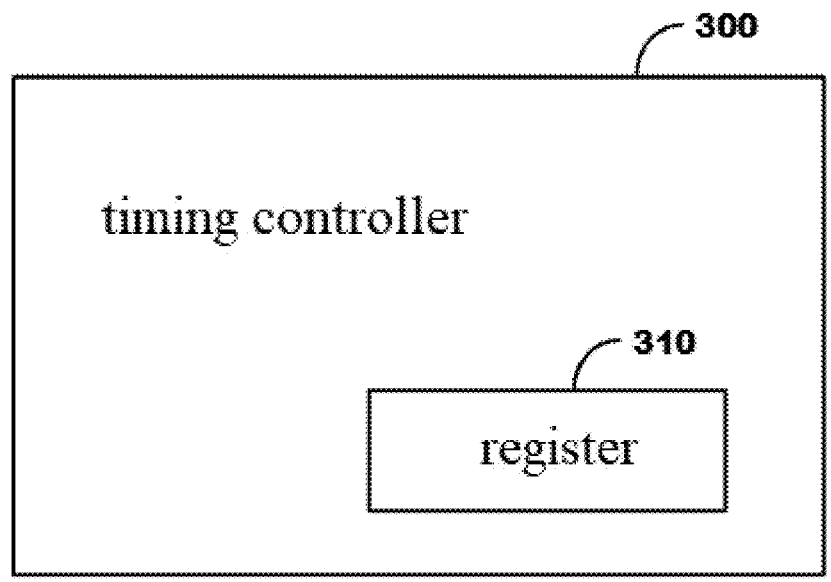
FIG. 2 is a schematic structural diagram of a timing controller provided by an embodiment of the application.
Figure 3:
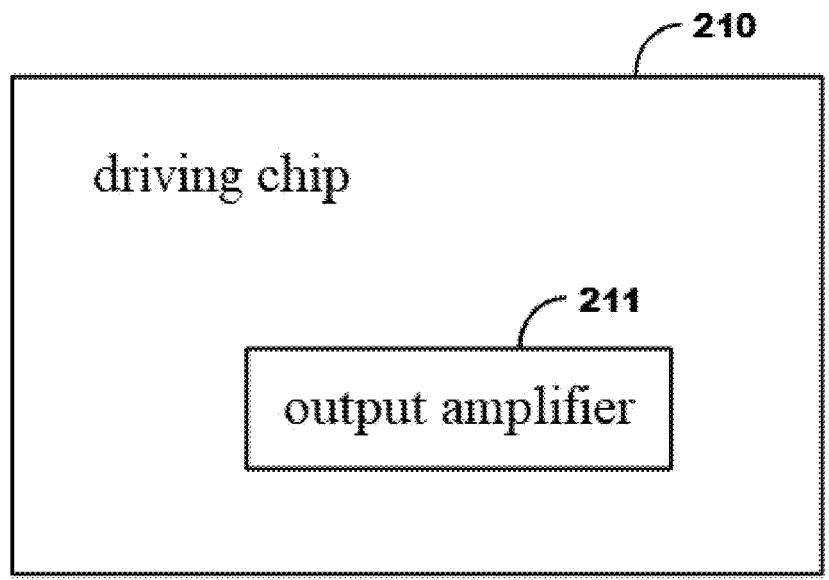
FIG. 3 is a schematic structural diagram of a driving chip provided by an embodiment of the application.

Referring to FIG. 1 to FIG. 8, as shown in FIG. 1 and FIG. 3, this embodiment provides a display device, which includes a display panel 100 and a data driver 200, the display panel 100 includes a plurality of data lines DL; an output terminal of the data driver 200 is electrically connected to each of the plurality of data lines DL, the data driver 200 includes at least one driving chip 210, each driving chip 210 may include at least one output amplifier 211, and the output amplifier 211 is configured to output a corresponding data signal to the display panel 100.

As shown in FIG. 1 and FIG. 2, the display device may further include a timing controller 300, which includes at least one register 310, wherein the at least one register 310 is configured to store configuration data corresponding to a start period, a sustain period, and an end period, a current value of a first bias current, a current value of a second bias current, and a current value of a third bias current; and wherein an output terminal of the timing controller 300 is electrically connected to an input terminal of the data driver 200, and the data driver 200 controls the output amplifier 211 to correspondingly output the data signal based on the configuration data received.

Figure 4:
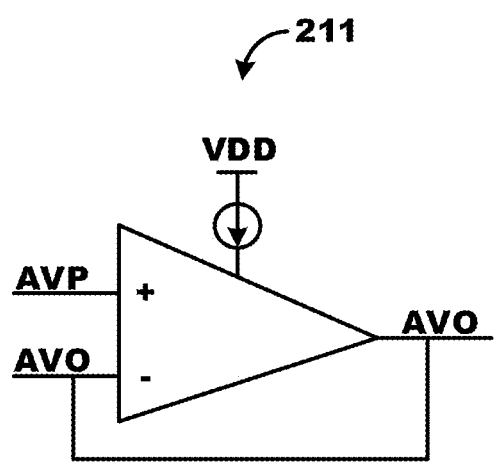
FIG. 4 is a schematic structural diagram of an output amplifier provided by an embodiment of the application.

As shown in FIG. 4, an inverting input terminal of the output amplifier 211 can be electrically connected to an output terminal of the output amplifier 211 to form a corresponding inverting voltage follower, which can be configured to amplify a current value of the data signal.

Figure 5:
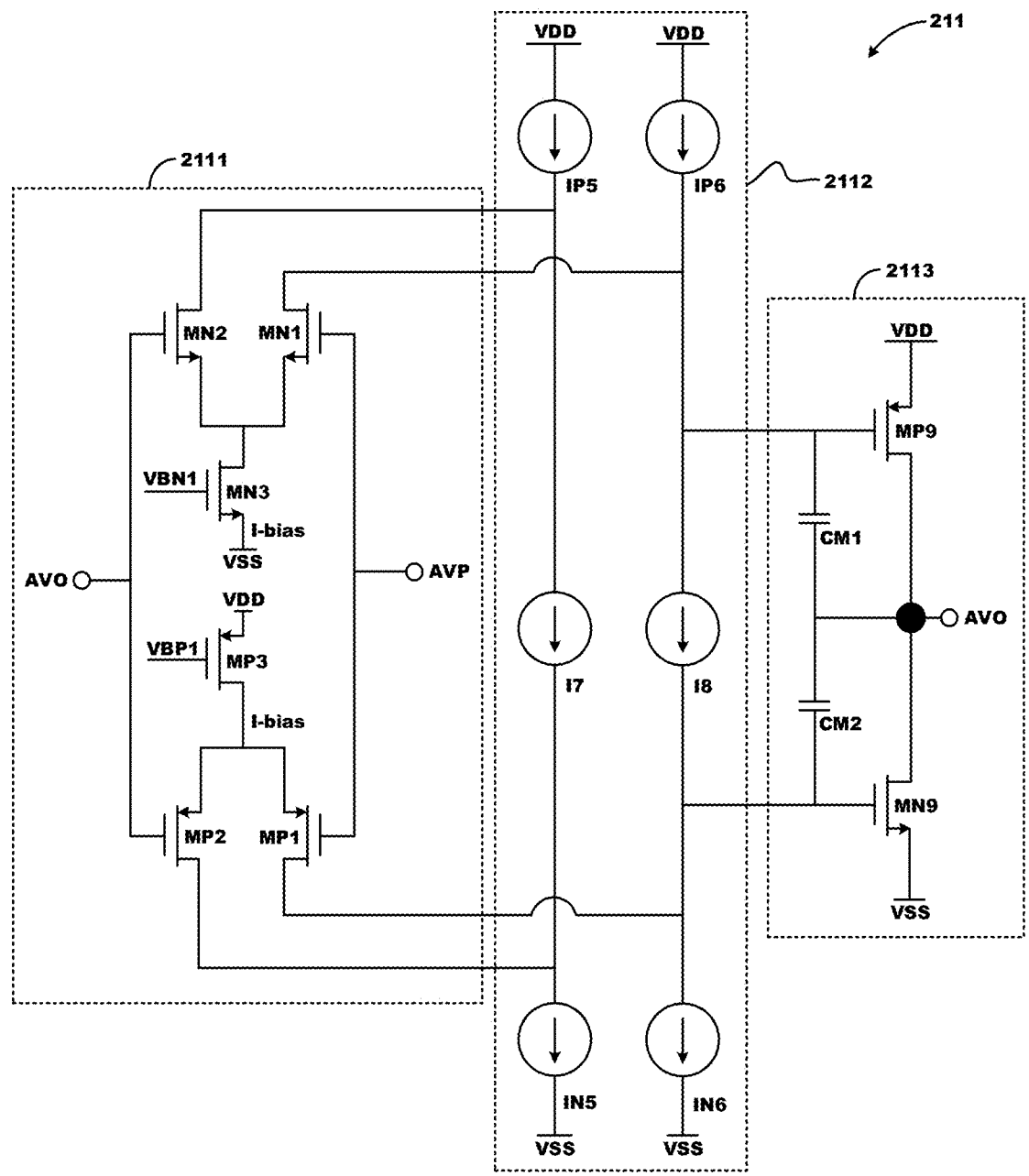
FIG. 5 is a schematic diagram of a circuit of the output amplifier in FIG. 4.

As shown in FIGS. 4 and 5, in an embodiment, the output amplifier 211 includes an input stage 2111, an amplification stage 2112, and an output stage 2113. An input stage 2111 is configured to access and differentially process a first input signal AVP and a second input signal AVO; an input terminal of the amplification stage 2112 is electrically connected to an output terminal of the input stage 2111, and is configured to amplify a difference result between the first input signal AVP and the second input signal AVO; and an input terminal of the output stage 2113 is electrically connected to an output terminal of the amplification stage 2112, and an output terminal of the output stage 2113 is configured to output the corresponding data signal.

The first input signal AVP can be connected to a non-inverting input terminal of the output amplifier 211, and the second input signal AVO can be connected to the inverting input terminal of the output amplifier 211.

As shown in FIG. 5, In an embodiment, the input stage 2111 includes a transistor MN1, a transistor MN2, a transistor MN3, a transistor MP3, a transistor MP2, and a transistor MP1. A gate of the transistor MN1 is configured to access the first input signal AVP, and the transistor MN1 is an N-channel transistor; a gate of the transistor MN2 is configured to access the second input signal AVO, and the transistor MN2 is an N-channel transistor; a drain of the transistor MN3 is electrically connected to a source of the transistor MN1 and a source of the transistor MN2, a gate of the transistor MN3 is configured to access a first control signal VBN1, a source of the transistor MN3 is configured to connect to a negative power signal VSS, and the transistor MN3 is an N-channel transistor; a source of the transistor MP3 is configured to connect to a positive power signal VDD, a gate of the transistor MP3 is configured to connect to a second control signal VBP1, and the transistor MP3 is a P-channel transistor; a transistor MP2, wherein a source of the transistor MP2 is electrically connected to a drain of the transistor MP3, a gate of the transistor MP2 is configured to access the second input signal AVO, and the transistor MP2 is a P-channel transistor; and a transistor MP1, wherein a source of the transistor MP1 is electrically connected to the drain of the transistor MP3, a gate of the transistor MP1 is configured to access the first input signal AVP, and the transistor MP1 is a P-channel transistor.

I-Bias Represents a Bias Current of the Output Amplifier 211.

As shown in FIG. 5, In an embodiment, the amplifying stage 2112 includes multiple current sources connected between the input stage 2111 and the output stage 2113, and the multiple current sources include an adjustable current source IP5, an adjustable current source I7, an adjustable current source IN5, an adjustable current source IP6, an adjustable current source I8, and an adjustable current source IN6. An input terminal of the adjustable current source IP5 is configured to access the positive power signal VDD, and an output terminal of the adjustable current source IP5 is electrically connected to a drain of the transistor MN2; an input terminal of the adjustable current source I7 is electrically connected to the output terminal of the adjustable current source IP5; an input terminal of the adjustable current source IN5 is electrically connected to an output terminal of the adjustable current source I7 and a drain of the transistor MP2, an output terminal of the adjustable current source IN5 is configured to connect to the negative power signal VSS, and the negative power signal VSS and the positive power signal VDD are used to form a DC power supply; an input terminal of the adjustable current source IP6 is configured to access the positive power signal VDD, an output terminal of the adjustable current source IP6 is electrically connected to the drain of the transistor MN1, an output current value of the adjustable current source IP6 is equal to an output current value of the adjustable current source IP5; an input terminal of the adjustable current source I8 is electrically connected to the output terminal of the adjustable current source IP6, and an output current value of the adjustable current source I8 is equal to an output current value of the adjustable current source I7; and an input terminal of the adjustable current source IN6 is electrically connected to the output terminal of the adjustable current source I8 and a drain of the transistor MP1, an output terminal of the adjustable current source IN6 is configured to connect to the negative power signal VSS, and an output current value of the adjustable current source IN6 is equal to an output current value of the adjustable current source IN5.

In an embodiment, the output stage 2113 includes a transistor MP9 and a transistor MN9. A gate of the transistor MP9 is electrically connected to the output terminal of the adjustable current source IP6, a source of the transistor MP9 is configured to connect to the positive power signal VDD, and a drain of the transistor MP9 is configured to output the data signal, and the transistor MP9 is a P-channel transistor; and a gate of the transistor MN9 is electrically connected to the output terminal of the adjustable current source I8, a drain of the transistor MN9 is electrically connected to the drain of the transistor MP9, and a source of the transistor MN9 is configured to connect to the negative power signal VSS.

In an embodiment, the output stage 2113 further includes a capacitor CM1 and a capacitor CM2. One terminal of the capacitor CM1 is electrically connected to the gate of the transistor MP9, and another terminal of the capacitor CM1 is electrically connected to the drain of the transistor MP9; and one terminal of the capacitor CM2 is electrically connected to the another terminal of the capacitor CM1, and another terminal of the capacitor CM2 is electrically connected to the gate of the transistor MN. It is appreciated that the capacitor CM1 and the capacitor CM2 can be configured to improve working stability of the output amplifier 211.

After the first input signal AVP and the second input signal AVO are differentially amplified by the input stage 2111 and the amplification stage 2112, the first input signal AVP and the second input signal AVO are output through the drains of the transistor MN1 and the transistor MP1 to drive the output stage 2113. The output stage 2113 is composed of the transistor MP9 and the transistor MN9. The output stage 2113 is composed of a common source amplifier circuit by the transistor MN9, and the PMOS transistor MP9 provides a bias current for the transistor MN9 and acts as an active load of the transistor MN9.

Figure 6:
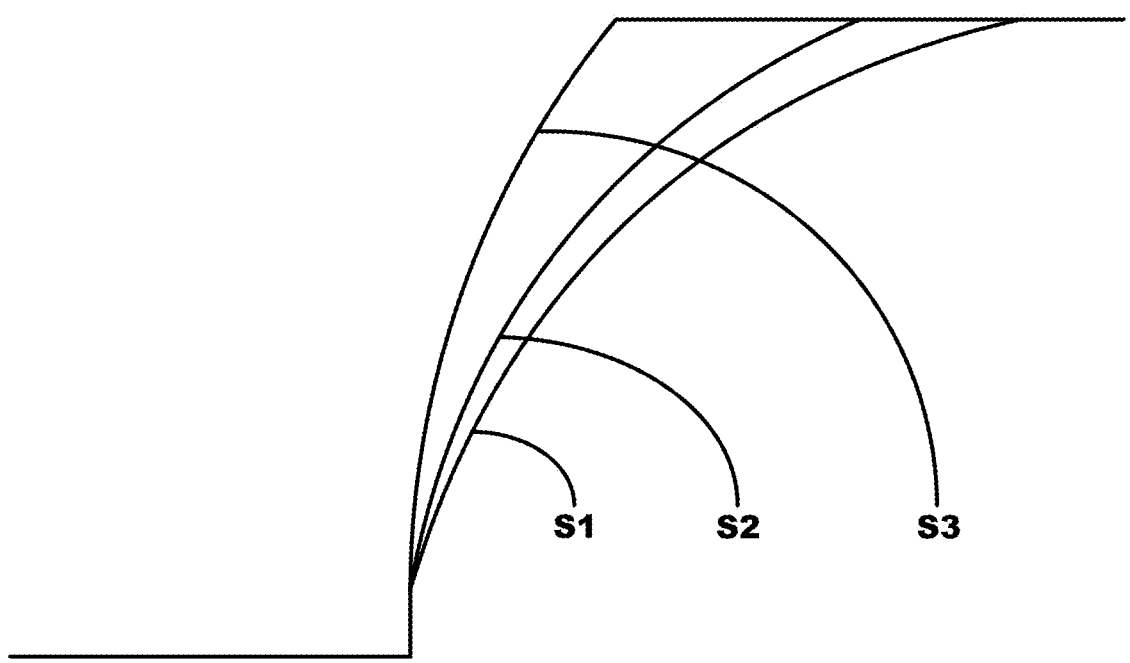
FIG. 6 is a schematic diagram of time required for a pulse edge skipping of a data signal which varies as a function of a bias current.

As shown in FIG. 6, a voltage change curve S1, a voltage change curve S2, and a voltage change curve S3 of the data signal output by the output amplifier 211 skipping from a low potential to a target high potential respectively correspond to 0.25 times the bias current, 0.5 times the bias current, and 1 times the bias current of the output amplifier 211. The voltage change curve S1, the voltage change curve S2, and the voltage change curve S3 take less and less time to skip from the low potential to the target high potential, that is, as the bias current of the output amplifier 211 provided in the present application increases, a time required for pulse edge skipping of the data signal becomes shorter and shorter. Correspondingly, charging efficiency/charging capability of the data signal becomes higher and higher.

Especially for display devices of high-frequency and/or high-resolution, a charging time that can be provided is shorter. Therefore, in such a shorter charging time, a waveform of the data signal can be closer to an ideal standard square wave signal, which can improve defects of insufficient charging of pixels, thereby improving the display quality.

Figures 7, 8:
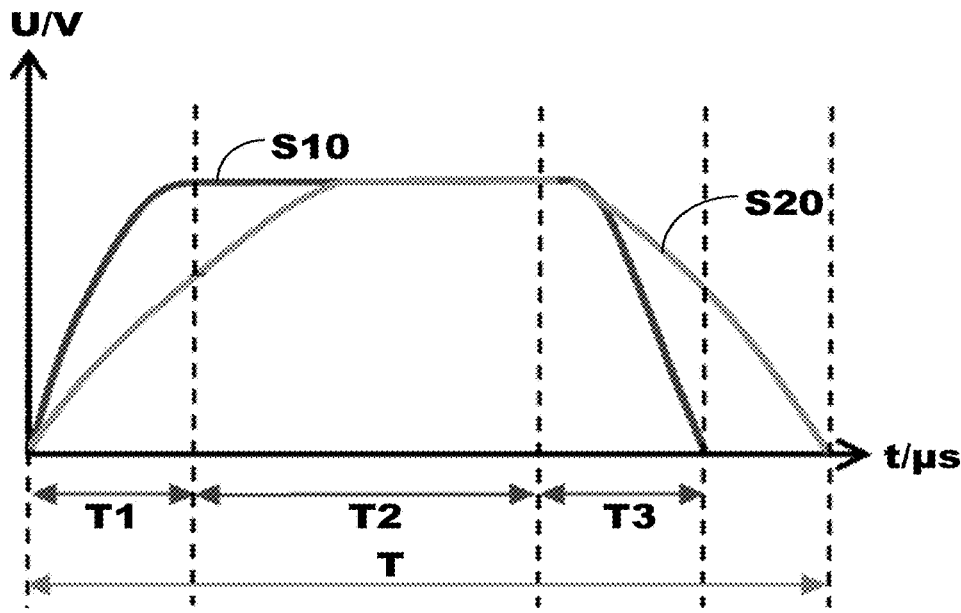
FIG. 7 is a schematic diagram showing comparison of waveforms of data signals corresponding to two different bias currents.
FIG. 8 is a comparison chart of power consumption corresponding to a variety of different display situations.

As shown in FIG. 7, the bias current of the output amplifier 211, for example, 0.5 times or 1 times the bias current, remains unchanged during a pulse duration T, and a potential change of the data signal output by the output amplifier 211 is like a waveform curve S20. The bias current of the output amplifier 211 is configured with different current values in the start period T1, the sustain period T2, and the end period T3. For example, in the start period T1, the output amplifier 211 has the first bias current; in the sustain period T2, the output amplifier 211 has the second bias current; in the end period T3, the output amplifier 211 has the third bias current; and in the case where a current value of the first bias current is greater than a current value of the second bias current, and/or a current value of the third bias current is greater than the current value of the second bias current, a potential change of the data signal output by the output amplifier 211 is like a waveform S10. For example, when the first bias current is 1 times the bias current, the second bias current is 0.5 times the bias current, and the third bias current is 1 times the bias current, it is easy to find through comparison, a time required for pulse edge skipping of the waveform curve S10 is significantly shorter than a time required for pulse edge skipping of the waveform curve S20, that is, a pulse edge of the waveform curve S10 is closer to a right angle, that is, an ideal standard square wave signal, which is more superior to improvement of insufficient charging.

In some embodiments, the current value of the first bias current is equal to or greater than the current value of the third bias current. It is appreciated that, in this embodiment, if a rising slope of the data signal can be made larger than a falling slope of the data signal while keeping the second bias current unchanged, a required high potential can be reached faster.

In some embodiments, a duration of the start period T1 is less than or equal to a duration of the sustain period T2; and/or a duration of the end period T3 is less than or equal to a duration of the sustain period T2.

In some of these embodiments, a duration of the start period T1 is equal to a duration of the end period T3.

As shown in FIG. 8, in order to achieve the same display quality, in the traditional output amplifier 211, if its bias current remains unchanged, the bias current needs to be kept at the first bias current or the third bias current, so that the second bias current in the sustain period T2 will produce power consumption waste for a longer time. Therefore, in overall comparison, power consumption required for the dynamically changing bias current is lower under the same display quality.

In view of above, FIG. 8 shows power consumption comparison data for different display situations, wherein "Pattern" is used to characterize a corresponding picture; "0white" is used to characterize a 0th white picture; "1Black" is used to characterize a 1st black picture; "3Green" is used to characterize a 3rd green picture; "5Gray191" is used to characterize a 5th picture with 191 grayscale; "7chess" is used to characterize a 7th checkerboard picture; "9H gray Bar" is used to characterize a 9th picture with horizontal gradient grayscale; "14colorbar" is used to characterize a 14th picture with color bar; "21Pixel on/off" is used to characterize a 21st picture with one bright pixel and one dark pixel; "22Window shutdown" is used to characterize a 22nd window picture; "23H_strip" is used to characterize a 23rd picture with one horizontal bright line and one horizontal dark line; and "32 Sub v-line" is used to characterizes a 32nd picture with one vertical bright line and one vertical dark line. "SDR ON" is used to indicate that a SDR function is turned on, that is, the bias current of the output amplifier 211 can be dynamically changed. "SDR OFF" is used to indicate that the SDR function is turned off, that is, the bias current of the output amplifier 211 remains unchanged. "$\Delta P$" refers to power consumption by the unit of Mw. "Power down" refers to a proportion of reduced power consumption.

In a corresponding picture, static power consumption in a SDR ON state is generally less than static power consumption in a SDR OFF state.

VAA, HVAA, and VDD respectively represent three different specifications of DC voltages required by the display device, and a sum of the power consumption of the three different specifications of DC voltages is the static power consumption of the display device.

In summary, under the same display quality, compared with the constant bias current in the traditional technical solution, the present application effectively reduces the display power consumption by configuring the output amplifier 211 with three dynamically changing bias currents.

In an embodiment, this embodiment provides an electronic device, which includes a mobile terminal and the display device in any of the foregoing embodiments; and the mobile terminal is combined with the display device.

In the display device and electronic device provided by the present application, the output amplifier 211 is provided with corresponding first bias current, second bias current, and third bias current in the start period, the sustain period, and the end period, respectively, and the current value of the first bias current is greater than the current value of the second bias current, and/or the current value of the third bias current is greater than the current value of the second bias current, so that time required for pulse edge skipping of the data signal can be effectively shorten, and charging ability of the data signal is improved, thereby improving the display quality. Meanwhile, under the same display quality, compared with a constant bias current in a traditional technical solution, the present application provides the output amplifier 211 with three dynamically changing bias currents, which effectively reduces display power consumption.

It should be noted that the electronic device in the above embodiment may be one of a mobile phone, a tablet computer, a notebook computer, an all-in-one computer, and a smart watch. For example, when the electronic device is a mobile phone, the mobile phone may include a display device and a mobile terminal, the display device can be installed on the mobile terminal, and the display device can also execute a video signal from the mobile terminal to display a corresponding picture.

In the above embodiments, the descriptions of each embodiment have their own emphasis. The parts that are not described in detail in an embodiment can be referred to the detailed descriptions in other embodiments above, which will not be repeated herein for brevity.

The display device and electronic device provided by the embodiments of the application are described in detail above. Specific examples are used in this document to explain the principles and implementation of the present invention. The descriptions of the above embodiments are only for understanding the method of the present invention and its core ideas, to help understand the technical solution of the present application and its core ideas, and a person of ordinary skill in the art should understand that it can still modify the technical solution described in the foregoing embodiments, or equivalently replace some of the technical features. Such modifications or replacements do not depart the spirit of the corresponding technical solutions beyond the scope of the technical solutions of the embodiments of the present application.

What is claimed is:

1. A display device, comprising:
a display panel comprising a plurality of data lines; and
a data driver, wherein an output terminal of the data driver is electrically connected to each of the plurality of data lines correspondingly, the data driver comprises an output amplifier, the output amplifier is configured to output a corresponding data signal to the display panel, and a duration of a pulse of the data signal comprises a start period, a sustain period, and an end period,
wherein, in the start period, the output amplifier has a first bias current; in the sustain period, the output amplifier has a second bias current; in the end period, the output amplifier has a third bias current; and a current value of the first bias current is greater than a current value of the second bias current, and/or a current value of the third bias current is greater than the current value of the second bias current, wherein the output amplifier comprises:
an input stage configured to access and differentially process a first input signal and a second input signal;
an amplification stage, wherein an input terminal of the amplification stage is electrically connected to an output terminal of the input stage, and is configured to amplify a difference result between the first input signal and the second input signal; and
an output stage, wherein an input terminal of the output stage is electrically connected to an output terminal of the amplification stage, and an output terminal of the output stage is configured to output the corresponding data signal,
wherein the input stage comprises:
a transistor MN1, wherein a gate of the transistor MN1 is configured to access the first input signal, and the transistor MN1 is an N-channel transistor;
a transistor MN2, wherein a gate of the transistor MN2 is configured to access the second input signal, and the transistor MN2 is an N-channel transistor;
a transistor MN3, wherein a drain of the transistor MN3 is electrically connected to a source of the transistor MN1 and a source of the transistor MN2, a gate of the transistor MN3 is configured to access a first control signal, a source of the transistor MN3 is configured to connect to a negative power signal, and the transistor MN3 is an N-channel transistor;
a transistor MP3, wherein a source of the transistor MP3 is configured to connect to a positive power signal, a gate of the transistor MP3 is configured to connect to a second control signal, and the transistor MP3 is a P-channel transistor;
a transistor MP2, wherein a source of the transistor MP2 is electrically connected to a drain of the transistor MP3, a gate of the transistor MP2 is configured to access the second input signal, and the transistor MP2 is a P-channel transistor; and
a transistor MP1, wherein a source of the transistor MP1 is electrically connected to the drain of the transistor MP3, a gate of the transistor MP1 is configured to access the first input signal, and the transistor MP1 is a P-channel transistor.

2. The display device according to claim 1, wherein the current value of the first bias current is equal to or greater than the current value of the third bias current.

3. The display device according to claim 1, wherein a duration of the start period is less than or equal to a duration of the sustain period; and/or a duration of the end period is less than or equal to the duration of the sustain period.

4. The display device according to claim 3, wherein the duration of the start period is equal to the duration of the end period.

5. The display device according to claim 1, wherein the amplification stage comprises:
an adjustable current source IP5, wherein an input terminal of the adjustable current source IP5 is configured to access the positive power signal, and an output terminal of the adjustable current source IP5 is electrically connected to a drain of the transistor MN2;
an adjustable current source I7, wherein an input terminal of the adjustable current source I7 is electrically connected to the output terminal of the adjustable current source IP5;
an adjustable current source IN5, wherein an input terminal of the adjustable current source IN5 is electrically connected to an output terminal of the adjustable current source I7 and a drain of the transistor MP2, an output terminal of the adjustable current source IN5 is configured to connect to the negative power signal, and the negative power signal and the positive power signal are used to form a DC power supply;
an adjustable current source IP6, wherein an input terminal of the adjustable current source IP6 is configured to access the positive power signal, an output terminal of the adjustable current source IP6 is electrically connected to the drain of the transistor MN1, an output current value of the adjustable current source IP6 is equal to an output current value of the adjustable current source IP5;
an adjustable current source I8, wherein an input terminal of the adjustable current source I8 is electrically connected to the output terminal of the adjustable current source IP6, and an output current value of the adjustable current source I8 is equal to an output current value of the adjustable current source I7; and
an adjustable current source IN6, wherein an input terminal of the adjustable current source IN6 is electrically connected to the output terminal of the adjustable current source I8 and a drain of the transistor MP1, an output terminal of the adjustable current source IN6 is configured to connect to the negative power signal, and an output current value of the adjustable current source IN6 is equal to an output current value of the adjustable current source IN5.

6. The display device according to claim 5, wherein the output stage comprises:
a transistor MP9, wherein a gate of the transistor MP9 is electrically connected to the output terminal of the adjustable current source IP6, a source of the transistor MP9 is configured to connect to the positive power signal, and a drain of the transistor MP9 is configured to output the data signal, and the transistor MP9 is a P-channel transistor; and
a transistor MN9, wherein a gate of the transistor MN9 is electrically connected to the output terminal of the adjustable current source I8, a drain of the transistor MN9 is electrically connected to the drain of the transistor MP9, and a source of the transistor MN9 is configured to connect to the negative power signal.

7. The display device according to claim 6, wherein the output stage further comprises:
a capacitor CM1, wherein one terminal of the capacitor CM1 is electrically connected to the gate of the transistor MP9, and another terminal of the capacitor CM1 is electrically connected to the drain of the transistor MP9; and
a capacitor CM2, wherein one terminal of the capacitor CM2 is electrically connected to the another terminal of the capacitor CM1, and another terminal of the capacitor CM2 is electrically connected to the gate of the transistor MN9.

8. The display device according to claim 1, wherein the display device further comprises:
a timing controller comprising at least one register, wherein the at least one register is configured to store configuration data corresponding to the start period, the sustain period, and the end period, the current value of the first bias current, the current value of the second bias current, and the current value of the third bias current; and
wherein an output terminal of the timing controller is electrically connected to the input terminal of the data driver, and the data driver controls the output amplifier to correspondingly output the data signal based on the configuration data received.

9. An electronic device, comprising:
the display device according to claim 1; and
a mobile terminal combined with the display device.

10. The electronic device according to claim 9, wherein the current value of the first bias current is equal to or greater than the current value of the third bias current.

11. The electronic device according to claim 9, wherein a duration of the start period is less than or equal to a duration of the sustain period; and/or a duration of the end period is less than or equal to the duration of the sustain period.

12. The electronic device according to claim 11, wherein the duration of the start period is equal to the duration of the end period.

13. The electronic device according to claim 9, wherein the amplification stage comprises:
an adjustable current source IP5, wherein an input terminal of the adjustable current source IP5 is configured to access the positive power signal, and an output terminal of the adjustable current source IP5 is electrically connected to a drain of the transistor MN2;
an adjustable current source I7, wherein an input terminal of the adjustable current source I7 is electrically connected to the output terminal of the adjustable current source IP5;
an adjustable current source IN5, wherein an input terminal of the adjustable current source IN5 is electrically connected to an output terminal of the adjustable current source I7 and a drain of the transistor MP2, an output terminal of the adjustable current source IN5 is configured to connect to the negative power signal, and the negative power signal and the positive power signal are used to form a DC power supply;
an adjustable current source IP6, wherein an input terminal of the adjustable current source IP6 is configured to access the positive power signal, an output terminal of the adjustable current source IP6 is electrically connected to the drain of the transistor MN1, an output current value of the adjustable current source IP6 is equal to an output current value of the adjustable current source IP5;
an adjustable current source I8, wherein an input terminal of the adjustable current source I8 is electrically connected to the output terminal of the adjustable current source IP6, and an output current value of the adjustable current source I8 is equal to an output current value of the adjustable current source I7; and
an adjustable current source IN6, wherein an input terminal of the adjustable current source IN6 is electrically connected to the output terminal of the adjustable current source I8 and a drain of the transistor MP1, an output terminal of the adjustable current source IN6 is configured to connect to the negative power signal, and an output current value of the adjustable current source IN6 is equal to an output current value of the adjustable current source IN5.

14. The electronic device according to claim 13, wherein the output stage comprises:
a transistor MP9, wherein a gate of the transistor MP9 is electrically connected to the output terminal of the adjustable current source IP6, a source of the transistor MP9 is configured to connect to the positive power signal, and a drain of the transistor MP9 is configured to output the data signal, and the transistor MP9 is a P-channel transistor; and
a transistor MN9, wherein a gate of the transistor MN9 is electrically connected to the output terminal of the adjustable current source I8, a drain of the transistor MN9 is electrically connected to the drain of the transistor MP9, and a source of the transistor MN9 is configured to connect to the negative power signal.

15. The electronic device according to claim 14, wherein the output stage further comprises:
a capacitor CM1, wherein one terminal of the capacitor CM1 is electrically connected to the gate of the transistor MP9, and another terminal of the capacitor CM1 is electrically connected to the drain of the transistor MP9; and
a capacitor CM2, wherein one terminal of the capacitor CM2 is electrically connected to the another terminal of the capacitor CM1, and another terminal of the capacitor CM2 is electrically connected to the gate of the transistor MN9.

16. The electronic device according to claim 9, wherein the display device further comprises:
a timing controller comprising at least one register, wherein the at least one register is configured to store configuration data corresponding to the start period, the sustain period, and the end period, the current value of the first bias current, the current value of the second bias current, and the current value of the third bias current; and
wherein an output terminal of the timing controller is electrically connected to the input terminal of the data driver, and the data driver controls the output amplifier to correspondingly output the data signal based on the configuration data received.

* * * * *